(12) United States Patent
Lobry et al.

(10) Patent No.: US 9,097,308 B2
(45) Date of Patent: Aug. 4, 2015

(54) CUSHION OR MATTRESS SUSPENSION ELEMENT

(75) Inventors: Jacques Lobry, Bourges (FR); Pascal Lobry, Bourges (FR); Géraud Cailley, Bourges (FR)

(73) Assignee: TOURNADRE SA STANDARD GUM, Bourges (FR)

( * ) Notice: Subject to any disclaimer, the term of this patent is extended or adjusted under 35 U.S.C. 154(b) by 0 days.

(21) Appl. No.: 14/119,198

(22) PCT Filed: May 22, 2012

(86) PCT No.: PCT/FR2012/051150
§ 371 (c)(1),
(2), (4) Date: Mar. 25, 2014

(87) PCT Pub. No.: WO2012/160310
PCT Pub. Date: Nov. 29, 2012

(65) Prior Publication Data
US 2014/0215722 A1    Aug. 7, 2014

(30) Foreign Application Priority Data
May 24, 2011 (FR) ...................................... 11 54523

(51) Int. Cl.
*F16F 1/36* (2006.01)
*A47C 23/00* (2006.01)
(Continued)

(52) U.S. Cl.
CPC ................. *F16F 1/36* (2013.01); *A47C 23/002* (2013.01); *A47C 23/04* (2013.01); *A47C 25/00* (2013.01); *A47C 27/065* (2013.01); *F16F 1/37* (2013.01); *A47C 27/20* (2013.01)

(58) Field of Classification Search
CPC ...... A47C 27/20; A47C 27/064; A47C 27/06; A47C 27/065; A47C 27/045; A47C 27/0453; A47C 27/04; A47C 23/02; A47C 23/002; A47C 23/048; A47C 23/05; A47C 23/0515; A47C 23/12; B60N 2/7094; F16F 1/37; F16F 1/36
USPC ........................ 5/247; 267/141, 164, 158, 153
See application file for complete search history.

(56) References Cited

U.S. PATENT DOCUMENTS 5,558,314 A * 9/1996 Weinstein ........................ 267/91
5,588,165 A * 12/1996 Fromme ............................ 5/247
(Continued)

FOREIGN PATENT DOCUMENTS

DE    202004017617 U1    2/2005
DE    202005010441 U1    8/2006
(Continued)

*Primary Examiner* — Peter M Cuomo
*Assistant Examiner* — Brittany Wilson
(74) *Attorney, Agent, or Firm* — MH2 Law Technology Law Group, LLP (57) ABSTRACT

The invention relates to the field of furniture, and in particular to a cushion or mattress suspension element 101, 201, . . . , 901 comprising a compressible core 102, 202, . . . , 902 of flexible material and presenting at least one compression axis Z, and also comprising two bearing parts 103, 203, . . . , 903 of material that is substantially more rigid than the material of the compressible core 102, 202, . . . , 902, with at least a first bearing part being connected to one end of the compressible core 102, 202, . . . , 902 and at least one second bearing part being connected to an end of the compressible core 102, 202, . . . , 902 that is opposite along the compression axis Z, and with each bearing part presenting an outer bearing area 103a, 203a, . . . , 903a that is substantially perpendicular to said compression axis Z and, in at least one direction perpendicular to the compression axis Z, that is substantially larger than the compressible core 102, 202, . . . , 902 in its relaxed position.

14 Claims, 8 Drawing Sheets

(51) Int. Cl.
*A47C 27/06* (2006.01)
*A47C 23/04* (2006.01)
*F16F 1/37* (2006.01)
*A47C 27/20* (2006.01)

(56) References Cited

U.S. PATENT DOCUMENTS

| | | | |
|---|---|---|---|
| 5,632,473 A * | 5/1997 | Dias Magalhaes Queiroz | 267/164 |
| 6,427,990 B1 * | 8/2002 | Hartmann | 267/158 |
| 6,435,490 B1 * | 8/2002 | Monson et al. | 267/141 |
| 6,533,258 B2 * | 3/2003 | Monson et al. | 267/153 |
| 7,458,172 B2 * | 12/2008 | Aveni | 36/27 |
| 7,798,298 B2 * | 9/2010 | Smaldone et al. | 188/372 |
| 2008/0189868 A1 | 8/2008 | Wieland | |
| 2011/0179580 A1 * | 7/2011 | Wieland | 5/719 |

FOREIGN PATENT DOCUMENTS

| | | |
|---|---|---|
| FR | 2894242 A1 | 6/2007 |
| WO | 9522922 A1 | 8/1995 |

* cited by examiner

# CUSHION OR MATTRESS SUSPENSION ELEMENT

TECHNICAL FIELD

The present invention relates to the field of furniture, and in particular to mattresses and cushions.

The invention relates more precisely to a cushion or mattress suspension element comprising at least a compressible core made of flexible material, that is preferably deformable in a manner that is at least partially elastic, and that presents at least one compression axis. In a particular application, a plurality of such elements are incorporated between the bottom and top faces of a mattress so as to provide a user of the mattress with support that is distributed and comfortable. Nevertheless, other applications may also be envisaged for such a cushion or mattress suspension element, such as for example in a seat cushion of a settee, armchair, or chesterfield.

BACKGROUND OF THE DISCLOSURE

In order to improve user comfort, novel materials, and in particular foams such as latex foams or high or low resilience foams, are being used in the field of stuffing mattresses and cushions. Nevertheless, such materials present certain drawbacks. In particular, in order to provide support that is sufficiently firm, it is preferable to use foams of relatively high density. That has negative repercussions both on the cost and on the weight of the cushion or mattress. Furthermore, such materials, and in particular closed-cell foams, do not provide significant ventilation.

In order to increase the sensation of firmness provided by a cushion or mattress, the person skilled in the art knows that a plurality of stiffener elements or inserts may be incorporated therein. Nevertheless, those elements are normally elastic elements that do not present the damping characteristics of foams.

SUMMARY OF THE DISCLOSURE

The present invention seeks to remedy those drawbacks. In particular, the invention seeks to propose a cushion or mattress suspension element that makes it possible to take advantage of the favorable characteristics of a flexible material in a cushion (for example) and in particular a seat cushion, or in a mattress, without making it substantially heavier, and in a manner that is less expensive.

This object is achieved by the fact that the cushion or mattress suspension element further includes at least two bearing parts of material that is substantially stiffer than the material of the compressible core. In the present context, the term "stiffer" is used to mean a material having a modulus of elasticity in compression that is greater. At least a first one of these bearing parts is connected to one end of the compressible core and at least one second part is connected to an end of the compressible core that is opposite along the compression axis, and with each part presenting an outer bearing area that is substantially perpendicular to the compression axis and, in at least one direction perpendicular to the compression axis, that is substantially larger than the compressible core in its relaxed position.

By means of these provisions, it is possible to use a compressible core of small section, while still distributing its load at both ends over the outer bearing areas. This serves to reduce the quantity of material required by the cushion or mattress suspension element, and thus to reduce its cost and its weight.

In addition, the empty space around the core enables the mattress to be better ventilated, thereby improving durability.

Preferably, the flexible material of the core is a foam. Particularly, but not exclusively, it may be a high resilience foam, i.e. a foam having resilience of at least 50% in application of the ball bounce test of the standard ISO 8307. The element may thus offer a combination of firmness and damping that contributes to greater user comfort and to good durability of the core. A foam thus presents advantages of flexibility and lightness, and also better thermal insulation. Nevertheless, as an alternative to such a foam, or in combination therewith, other types of material may also be used in the compressible core, such as for example a gel or an elastic material forming a hollow body. Suitable foams include both latex foams and synthetic foams of the so-called viscoelastic type, of the shape memory type, or of the low resilience type.

Preferably, at least one of the bearing parts presents at least one through orifice for ventilation, thereby further improving the flow of air through the cushion or mattress.

In at least one embodiment, the core may present a cross-section relative to the compression axis that is cruciform, in order to avoid the core buckling. The mechanical response of the core to forces, including forces that are off-center, is thereby improved. Nevertheless, other sections may also be considered as alternatives by the person skilled in the art and depending on circumstances. In particular, a round section may be adopted if it is desired in contrast to facilitate bending of the compressible core perpendicularly to the compression axis.

Preferably, at least one of the bearing parts is fastened to the compressible core by clamping against the compressible core perpendicularly to the compression axis, thereby making it easier to assemble the cushion or mattress suspension element. Nevertheless, it is also possible to envisage other alternatives, such as adhesive bonding, for example.

Another object of the invention is to combine the mechanical response of the material of the compressible core with the mechanical response of some other material. For this purpose, in at least one embodiment, the cushion or mattress suspension element may also include at least one spring secured to at least one of the bearing parts. It then becomes possible to combine the stiffness and the resilience of the spring with the damping of the core.

Said spring is preferably formed integrally with the at least one of the bearing parts to which it is secured. This facilitates fabrication of the cushion or mattress suspension element.

In at least one embodiment, said spring is interposed between the bearing part to which it is secured and the compressible core. Thus, the spring and the compressible core are connected in series in such a manner that they are normally subjected to substantially the same compression forces along the main axis of the compressible core.

Nevertheless, as an alternative, in at least one other embodiment, said spring is secured to at least one of the bearing parts at each end of the compressible core. Thus, the spring and the compressible core are both connected in parallel and are interposed between the bearing parts at one end and at the other, in such a manner that the spring and the compressible core are normally subjected to substantially the same amount of deformation in compression along the main axis of the compressible core. Under such circumstances, said spring may advantageously be arranged to clamp against an intermediate segment of the compressible core perpendicularly to the compression axis, at least when the cushion or mattress suspension element is under compression, thereby increasing the strength of the cushion or mattress suspension element against compression over at least a portion of its compression stroke.

Preferably, said spring includes at least one flexible spring blade serving in particular to make it easier to incorporate with at least one of the bearing parts. By way of example, such a flexible spring blade may be injection molded together with at least one of the bearing parts.

In at least one embodiment, the cushion or mattress suspension element includes only one of said bearing parts at each end of the compressible core. Nevertheless, in an alternative, the cushion or mattress suspension element may have a plurality of said bearing parts at each end of the compressible core. Under such circumstances, the bearing parts at each end of the compressible core may be connected together laterally by flexible connections, and in particular by flexible connections that are formed integrally with the bearing parts. Furthermore, a plurality of cushion or mattress suspension elements may form a module in which at least one of said bearing parts of one of said elements is connected laterally by flexible connections to at least one bearing part of another one of said elements.

The present invention also provides a cushion or mattress presenting a top face and a bottom face substantially opposite said top face, and including between said bottom and top faces at least a plurality of such cushion or mattress suspension elements.

BRIEF DESCRIPTION OF THE DRAWINGS

The invention can be well understood and its advantages appear better on reading the following detailed description of four embodiments given as non-limiting examples. The description refers to the accompanying drawings, in which.

MORE DETAILED DESCRIPTION

Figure 1A:
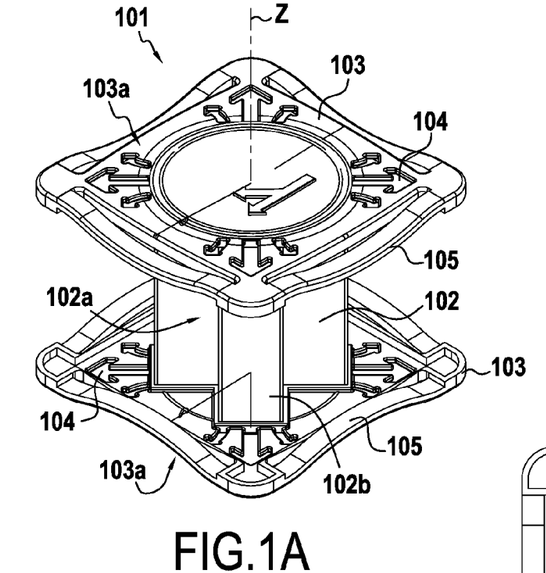
FIG. 1A is a perspective view of a cushion or mattress suspension element in a first embodiment of the invention.

A cushion or mattress suspension element 101 in a first embodiment is shown in FIG. 1A. This cushion or mattress suspension element 101 comprises a compressible core 102 of flexible material, having two opposite ends 102a and 102b and a compression axis Z, together with a bearing part 103 fastened to each of the two ends 102a, 102b. In this first embodiment, the compressible core 102 presents a cross-section relative to the axis Z that is cruciform so as to stabilize it in the transverse plane and prevent it from buckling under compression. The compressible core 102 may be formed by extruding a flexible synthetic foam along the compression axis Z, which foam is preferably of the so-called "high resilience" type, i.e. it is conventionally understood as presenting resilience of at least 50% in a ball bounce test in application of the standard ISO 8307. In particular, the foam may be a polyurethane foam, that presents density lying more particularly in the range 30 kilograms per cubic meter (kg/m$^3$) to 150 kg/m$^3$. The bearing parts 103 are made of a material that is substantially more rigid, i.e. that presents a modulus of elasticity that is substantially higher than that of the material of the compressible core 102, and each of the two bearing parts 103 presents an outer bearing area 103a that is substantially larger than the area of the cross-section of the compressible core 102. Thus, a load transmitted by the compressible core 102 in compression may be distributed by the bearing part 103 at each end of the element 101 over a greater bearing area. The bearing area of the element 101 is thus not determined by the cross-section of the compressible core 102 relative to the compression axis Z.

Figure 1B:
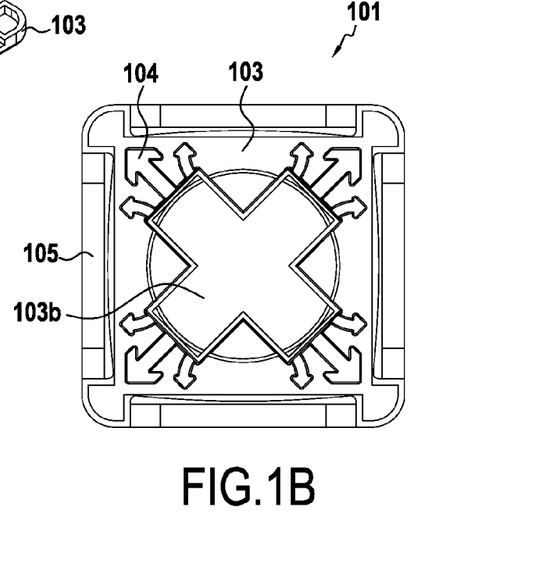
FIG. 1B is a face view of a bearing part of the FIG. 1A cushion or mattress suspension elements.

As can be seen more clearly in FIG. 1B, each bearing part 103 presents an inside surface 103b adapted to be adhesively bonded to one or the other of the ends 102a, 102b of the compressible core. In addition, each bearing part 103 also presents through orifices 104 around this inner surface 103b and serving to provide better ventilation for the cushion or mattress. By way of example, the bearing parts 103 may be made by injection molding. The material used may in particular, be an elastic material that is natural, such as rubber, or synthetic, in particular a thermoplastic elastomer, specifically a thermoplastic polyester elastomer (TPEE), which is a polyester copolymer having a high modulus of elasticity. It is thus possible for each bearing part 103 to be formed integrally with spring blades 105 projecting from the inside of the bearing part 103. In this embodiment, the purpose of the spring blades 105 is to increase the strength of the element 101 at the end of the compression stroke, when the spring blades 105 of the opposite bearing parts 103 come into contact.

Although the bearing parts 103 in this first embodiment are adhesively bonded to the ends 102a, 102b of the compressible core 102, they may be fastened using other alternatives. Thus, in a second embodiment shown in FIGS. 2A and 2B, the ends 202a, 202b of the compressible core 202 of a cushion or mattress suspension element 201 are clamped perpendicularly to the compression axis Z by collars 203c secured to the inner faces of each of the bearing parts 203. Thus, the bearing parts 203 may be fastened to each of the ends 202a, 202b of the compressible core 202 merely by inserting the ends 202a, 202b in the collars 203c of the corresponding bearing parts 203. As in the first embodiment, the compressible core 202 is made of flexible material and may in particular be made by extruding a high resilience flexible synthetic foam, and in particular a polyurethane foam that presents density lying more particularly in the range 30 kg/m$^3$ to 150 kg/m$^3$. Nevertheless, in this second embodiment, the cross-section of the compressible core 202 is round and not cruciform, thereby not only making it easier to fasten the collars 203c onto its ends, but also making it easier to bend the compressible core 202 perpendicularly relative to its main axis Z, thus forming a ball-joint type hinge between the bearing parts 203.

Figure 2A:
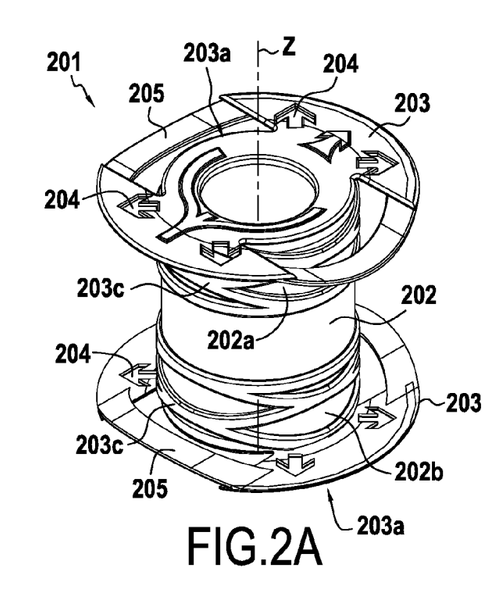
FIG. 2A is a perspective view of a cushion or mattress suspension element in a second embodiment of the invention.
Figure 2B:
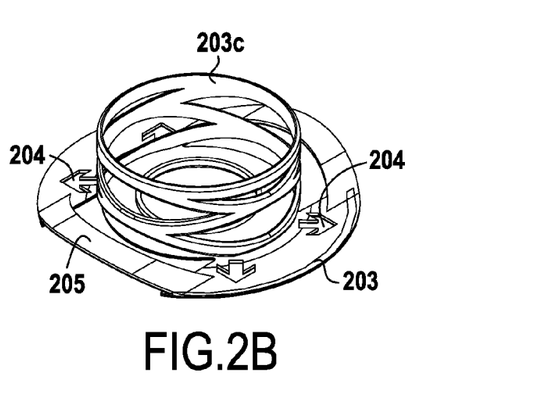
FIG. 2B is a perspective view of a bearing part of the FIG. 2A cushion or mattress suspension element.

Around the collars 203c, each bearing part 203 also has through orifices 204 serving to provide better ventilation of the mattress or cushion. As in the first embodiment, the bearing parts 203 may be made by injection molding, for example. The material used may, in particular be an elastic material that is natural, such as rubber, or that is synthetic, in particular a thermoplastic elastomer, specifically a thermoplastic polyester elastomer. Spring blades 205 are also formed projecting from the inside of each bearing part 203 in order to increase the strength of the element 201 at the end of the compression stroke, when the spring blades 205 of each bearing part 203 come into contact with the opposite bearing part 203.

Spring blades may also be arranged so as to be stressed also at the beginning of the compression stroke and not only at the end of the stroke. In a third embodiment shown in FIGS. 3A and 3B, the suspension element 301 has spring blades 305 formed integrally with the bearing parts 303 and interposed between the bearing parts 303 and the compressible core 302. Thus, at either end of the compressible core 302, these spring blades 305 form a spring that is less damped than the compressible core 302, and that is connected in series therewith so as to be subjected to the same compression forces.

Figure 3A:
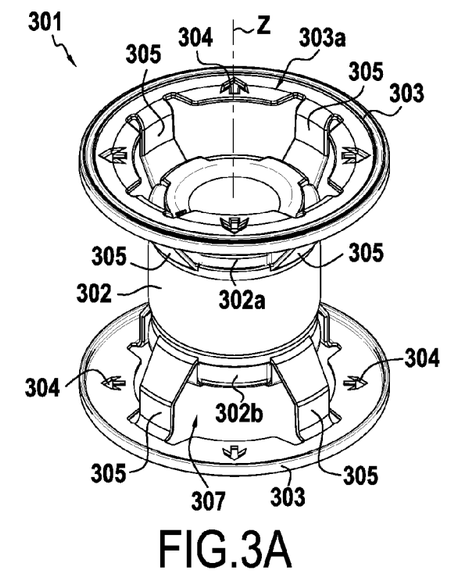
FIG. 3A is a perspective view of a cushion or mattress suspension element in a third embodiment of the invention.
Figure 3B:
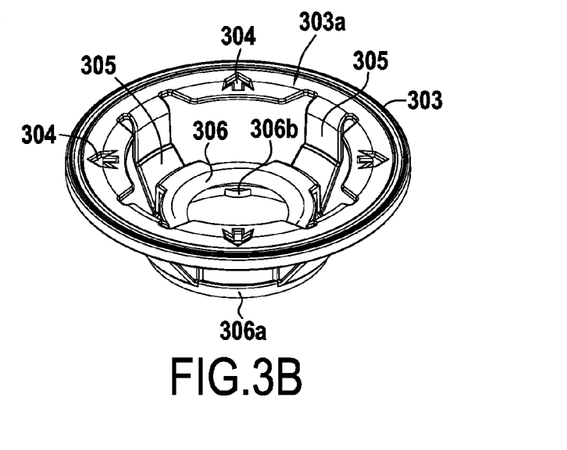
FIG. 3B is a perspective view of a bearing part of the FIG. 3A cushion or mattress suspension element.

At either end of the compressible core 302, the connection between the spring blades 305 and the compressible core 302 is made via an endpiece 306 that is also formed integrally with the spring blades 305 and the bearing parts 303, and that presents a belt 306a with projections 306b for catching the outside surface of the compressible core 302, as shown in FIG. 3B. In addition to through orifices 304 of the same type as those in the first and second embodiments, each of the bearing parts 303 also presents a large central opening 307 that is complementary to the outline of the spring blades 305 and of the endpiece 306 in a plane extending transversely to the main axis Z, thus making it possible not only to improve ventilation of the cushion or mattress, but also to improve injection molding of the bearing part 303, of the spring blades 305, and of the endpiece 306 as a single part in a mold without slides. As in the above-described embodiments, this unit can be made with an elastic material that is natural, such as rubber, or that is synthetic, and in particular a thermoplastic elastomer, specifically a thermoplastic polyester elastomer.

As in the first and second embodiments, the compressible core 302 is made of flexible material and may in particular be made by extruding a high resilience flexible synthetic foam, and in particular a polyurethane foam, presenting density lying more particularly in the range 30 kg/m$^3$ to 150 kg/m$^3$. As in the second embodiment, the cross-section of the compressible core 302 is round and not cruciform, thereby not only facilitating insertion and fastening of its ends 303a, 303b in the endpieces 306, but also facilitating bending of the compressible core 302 perpendicularly to the compression axis Z, thus forming a ball-joint type hinge between the bearing parts 303.

As an alternative to this series arrangement, it is also possible to envisage an arrangement of the spring in parallel with the compressible core. Thus, in a fourth embodiment shown in FIGS. 4A and 4B, the two bearing parts 403 of the suspension element 401 are connected together by the spring blades 405 with which they are made integrally, e.g. by injection molding. The material used may in particular be an elastic material that is natural, such as rubber, or that is synthetic, in particular a thermoplastic elastomer, specifically a thermoplastic polyester elastomer. In this fourth embodiment, the spring blades 405 are also connected together by a belt 408 that transversally clamps an intermediate segment of the compressible core 402 situated between the ends 402a, 402b. As in the third embodiment, each bearing part 403 presents not only through orifices 404 of the same type as in the first and third embodiments, but also a large central opening 407, having the main purpose in this fourth embodiment of allowing the compressible core 402 to be inserted between the two bearing parts 403. After this insertion, closure parts 409 (shown in dashed lines in FIG. 4B) may be clipped to these central openings 407 so as to retain the compressible core 402 in the cushion or mattress suspension element 401 between the bearing parts 403.

Figure 4A:
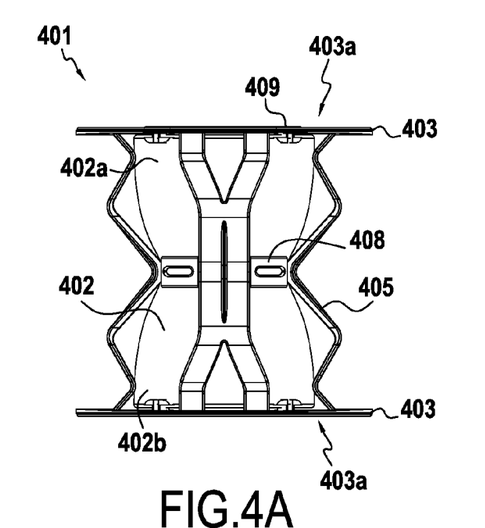
FIGS. 4A and 4B are respectively a side view and a perspective view of a cushion or mattress suspension element in a fourth embodiment of the invention.
Figure 4B:
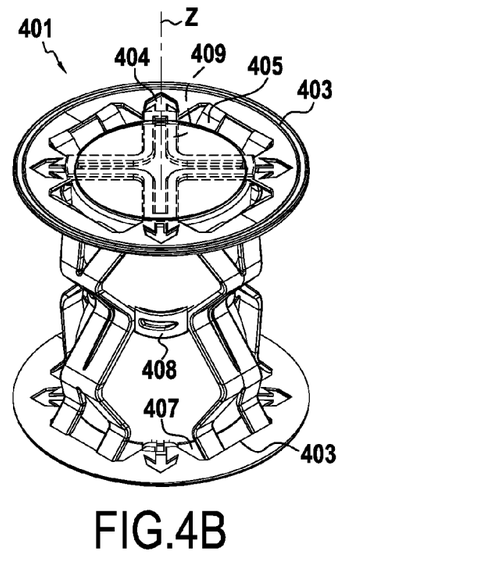

As in the above-described embodiments, the compressible core 402 is made of flexible material and it may in particular be made by extruding a high resilience flexible synthetic foam, and in particular a polyurethane foam presenting density lying more particularly in the range 30 kg/m$^3$ to 150 kg/m$^3$. Since the compressible core 402 connects together the bearing parts 403 in parallel with the spring formed by the spring blades 405, when a compression force moves these bearing parts 403 towards each other, the compressible core 402 and the spring blades 405 are subjected to substantially the same amount of deformation along the compression axis Z. Simultaneously, the belt 408 that is incorporated in the spring formed by the spring blades 405 prevents the intermediate segment of the compressible core 402 from expanding radially, thereby increasing the stiffness of the cushion or mattress suspension element 401, while also making it easier for it to bend perpendicularly to the compression axis Z.

Figure 5:
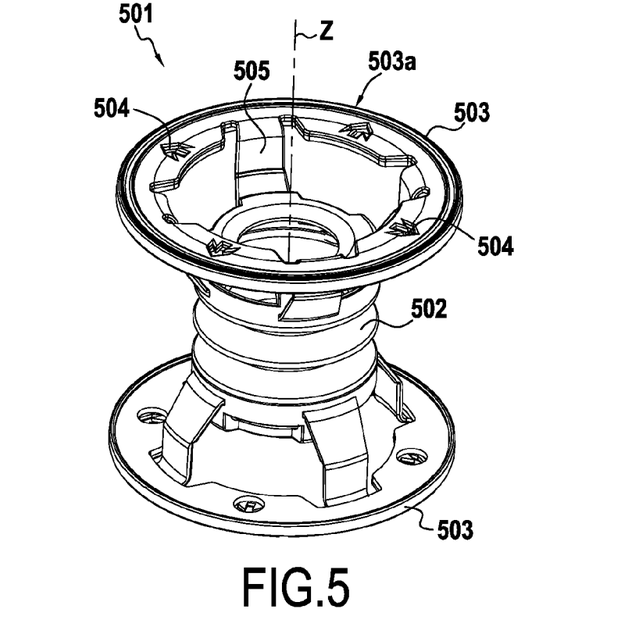
FIG. 5 is a perspective view of a cushion or mattress suspension element in a fifth embodiment of the invention.

In a fifth embodiment, shown in FIG. 5, the compressible core 502 of the suspension element 501 is not made of foam but of a hollow elastic material, and it presents a bellows shape. As in the third embodiment, spring blades 505 formed integrally with the bearing parts 503 are interposed between the bearing parts 503 and the compressible core 502, so as to form at either end of the compressible core 502, a spring that is less damped than the compressible core 502, the spring being connected in series with the compressible core 502 so as to be subjected to the same compression forces as the compressible core 502. Each of the bearing parts 503 presents an outer bearing area 503a that is substantially greater than the area of the compressible core 502 in cross-section relative to the compression axis Z, and through orifices 504 for improving ventilation of the cushion or mattress.

Figure 6A:
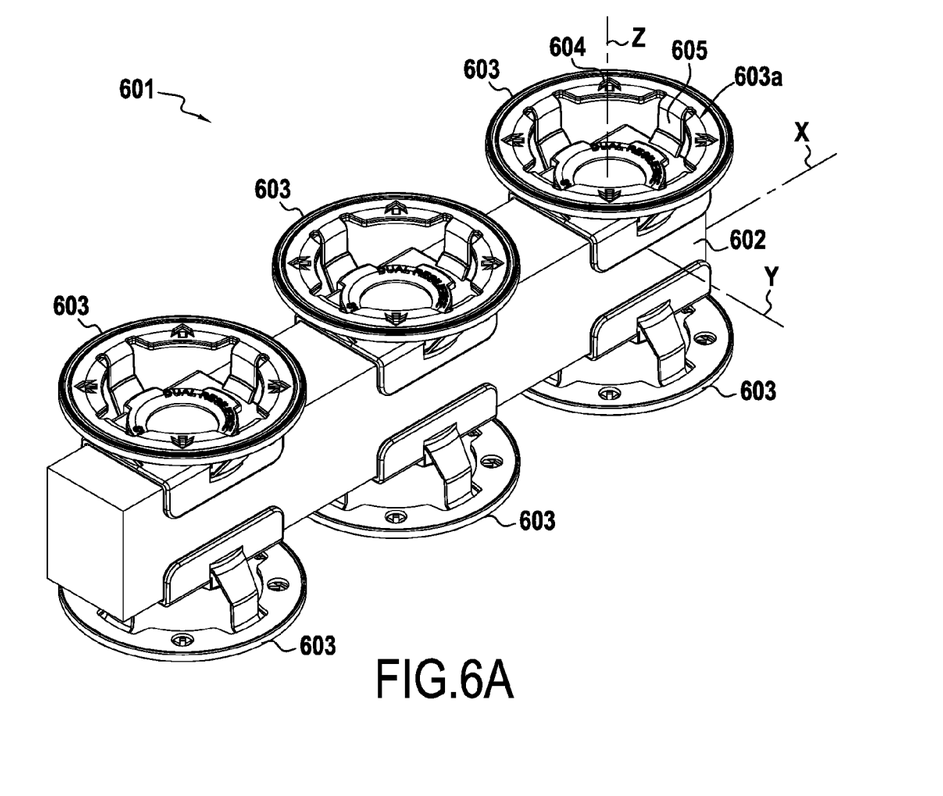
FIG. 6A is a perspective view of a cushion or mattress suspension element in a sixth embodiment of the invention.
Figure 6B:
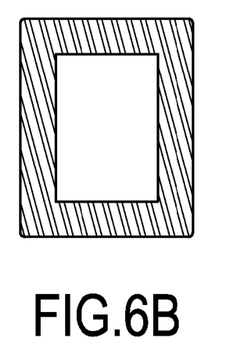
FIGS. 6B to 6H show alternative sections for the compressible core of the FIG. 6A cushion or mattress suspension element.
Figure 6C:
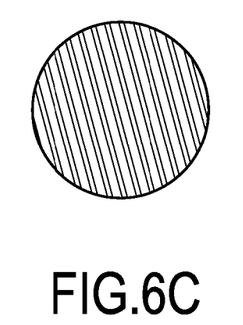
Figure 6D:
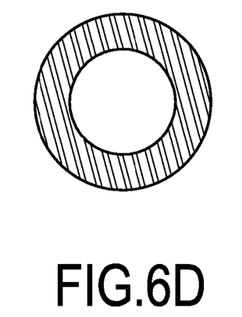
Figure 6E:
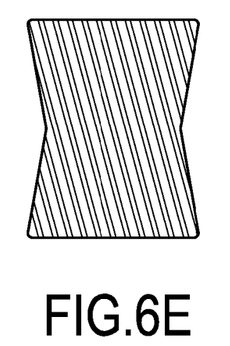
Figure 6F:
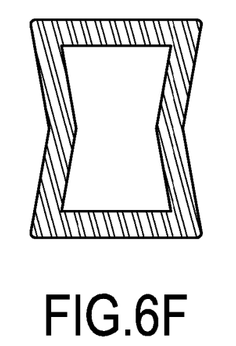
Figure 6G:
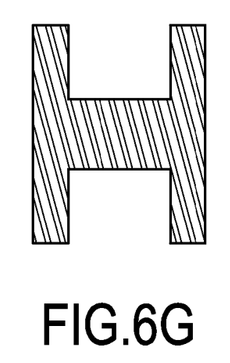
Figure 6H:
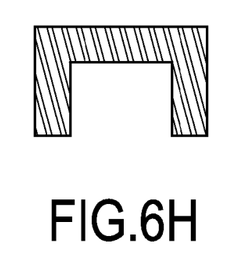

In a sixth embodiment, shown in FIG. 6A, the compressible core 602 is elongate along an axis X perpendicular to the compression axis Z, and a plurality of bearing parts 603 are arranged above and below the compressible core 602 so as to form the cushion or mattress suspension element 601. As in the third embodiment, spring blades 605 that are formed integrally with the bearing parts 603 are interposed between these bearing parts 603 and the compressible core 602 so as to form above and below the compressible core 602 springs that are less damped than the compressible core 602, which springs are connected in parallel with one another but in series with the compressible core 602, so as to be subjected together to the same compression forces as the compressible core 602. Each of the bearing parts 603 presents an outer bearing area 603a that is substantially larger than the compressible core 602 along an axis Y that is perpendicular to the axes Z and X, and through orifices 604 serving to provide better ventilation of the cushion or mattress.

As in the first and fourth embodiments, the compressible core 602 is made of flexible material and may in particular be made by extruding a high resilience flexible synthetic foam, and specifically a polyurethane foam, presenting density lying more particularly in the range 30 kg/m$^3$ to 150 kg/m$^3$. Nevertheless, in this embodiment, the material is not extruded along the compression axis Z, but along the axis X that is perpendicular thereto. In addition, although the compressible core 602 of this embodiment as shown in FIG. 6A presents a solid rectangular cross-section relative to the axis X, it is possible to envisage using other solid or hollow sections as alternatives, such as the sections shown in FIGS. 6B to 6H. It is also possible to envisage using materials other than foams, in particular with sections that are hollow.

Figure 7:
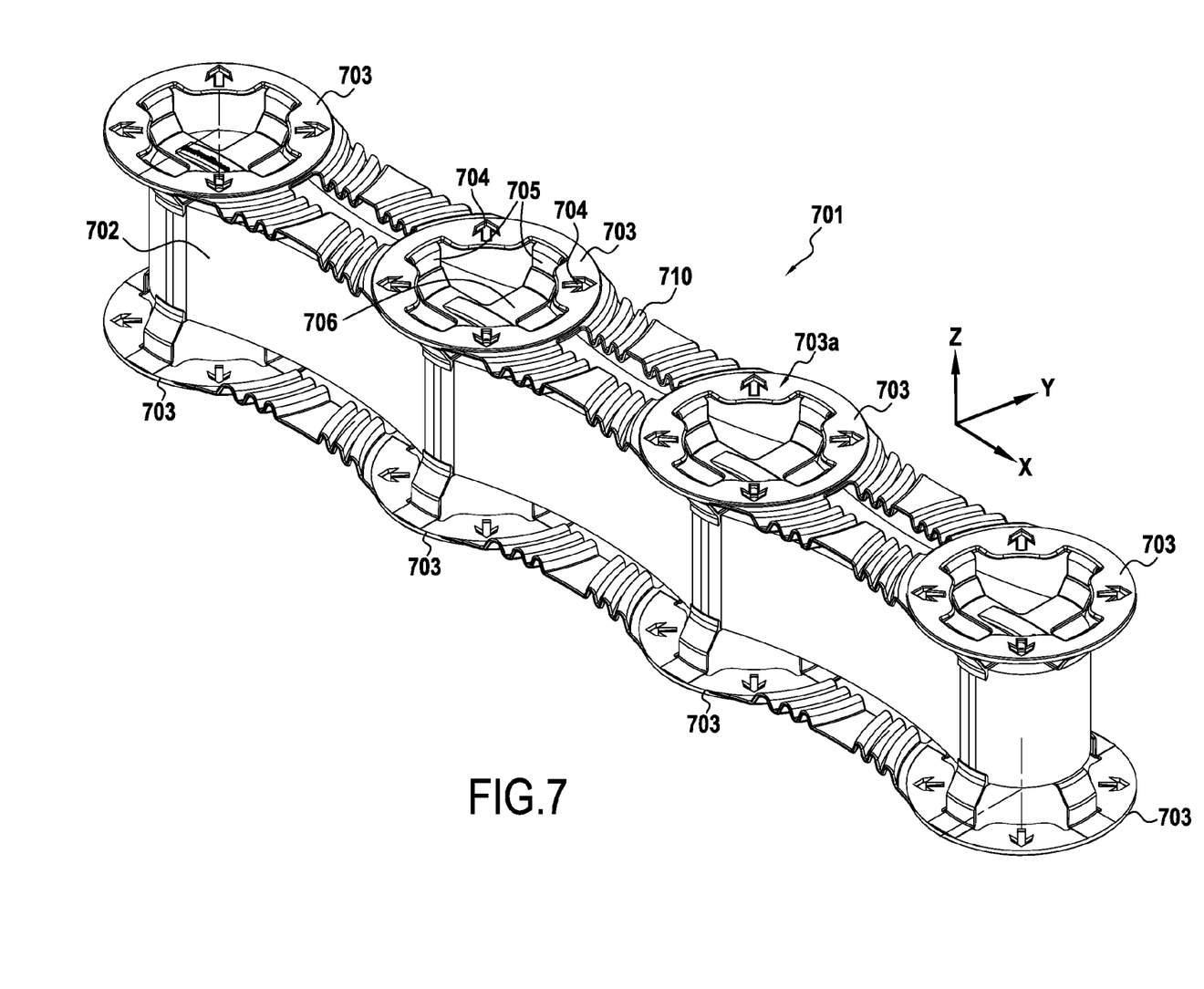
FIGS. 7 and 8 are perspective views of cushion or mattress suspension elements respectively in seventh and eighth embodiments of the invention.
Figure 8:
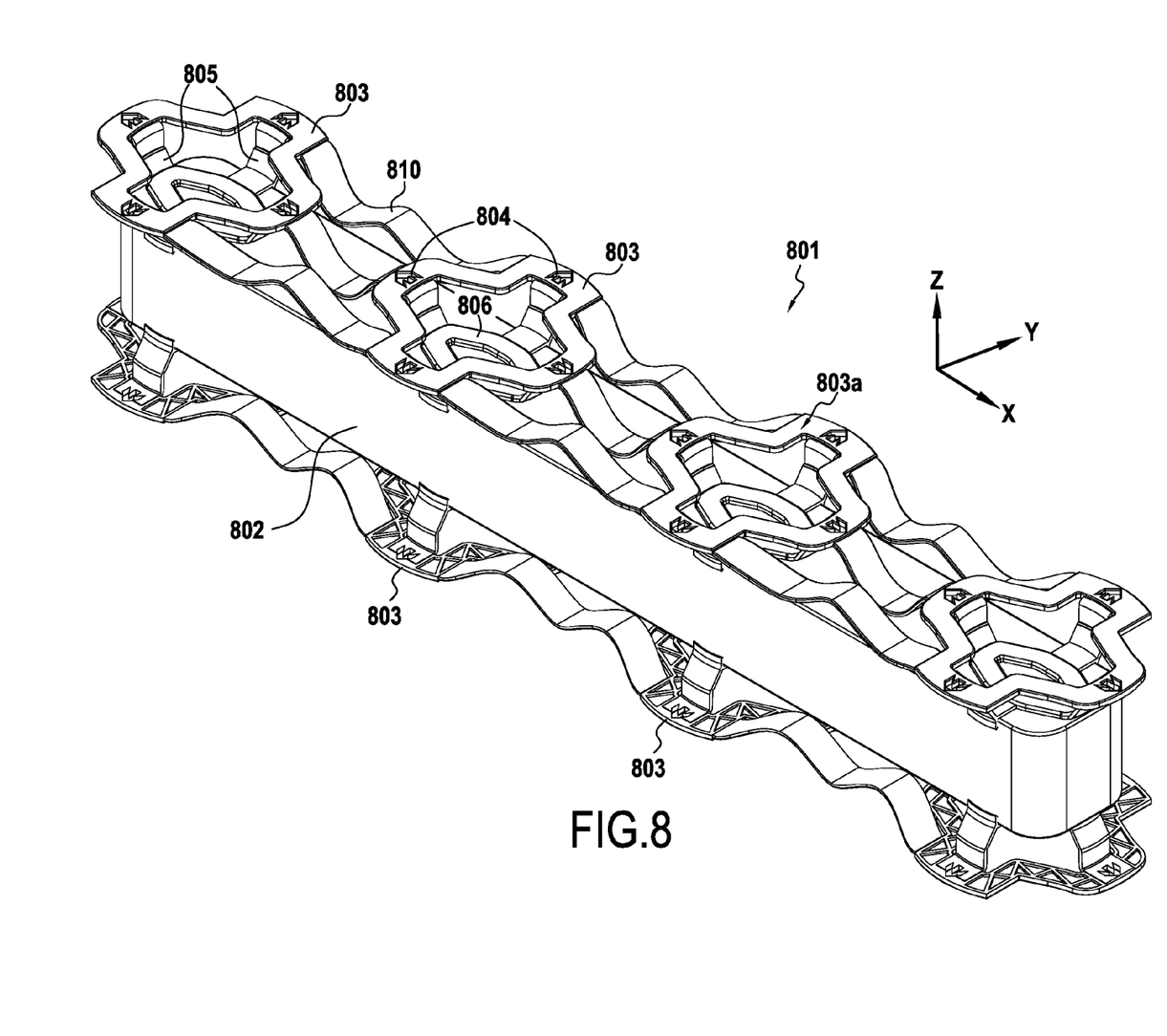

In elements 701, 801 in seventh and eighth embodiments, as shown respectively in FIGS. 7 and 8, the compressible core 702 or 802 is likewise elongate along an axis X perpendicular to the compression axis Z, and a plurality of bearing parts 703 or 803 are arranged above and below the compressible core 702, 802 in order to form the cushion or mattress suspension element 701, 801. The compressible core 702, 802 is likewise made of flexible material and may in particular be made of extruding a high resilience flexible synthetic foam, and in particular a polyurethane foam presenting density lying more particularly in the range 30 kg/m$^3$ to 150 kg/m$^3$. As in the third and sixth embodiments, spring blades 705, 805 formed integrally with the bearing parts 703, 803 are interposed between these bearing parts 703, 803 and the compressible core 702, 802 so as to form above and below the compressible core 702, 802 springs that are less damped than is the compressible core 702, 802 and that are connected in parallel with one another but in series with the compressible core 702, 802 so as to be subjected together to the same compression forces as the compressible core 702, 802. Above and below each compressible core 702, 802, the connections between the spring blades 705, 805 and the compressible core 702, 802 are made by means of endpieces 706, 806 that are also made integrally with the spring blades 705, 805 and the bearing parts 703, 803. Each of the bearing parts 703, 803 thus presents an outer bearing area 703a, 803a that is substantially larger than the compressible core 702, 802 along an axis Y perpendicular to the axes Z and X, with through orifices 704, 804 providing better ventilation for the cushion or mattress. Nevertheless, in each of these embodiments, the bearing parts 703, 803 above and below the compressible core 702, 802 and adjacent thereto are connected together by flexible connections 710, 810 that allow the elements 701, 801 to bend in the XZ plane. In both of these embodiments, these flexible connections 710, 810 are formed integrally with the bearing parts 703, 803. Nevertheless, in the seventh embodiment, the flexible connections 710 are concertina-shaped, whereas in the eighth embodiment, the flexible connections 810 present a zigzag shape. Furthermore in the seventh embodiment, the width along the axis Y of the compressible core 702 varies along axis X, so that the core 702 present zigzag side surfaces.

Figure 9:
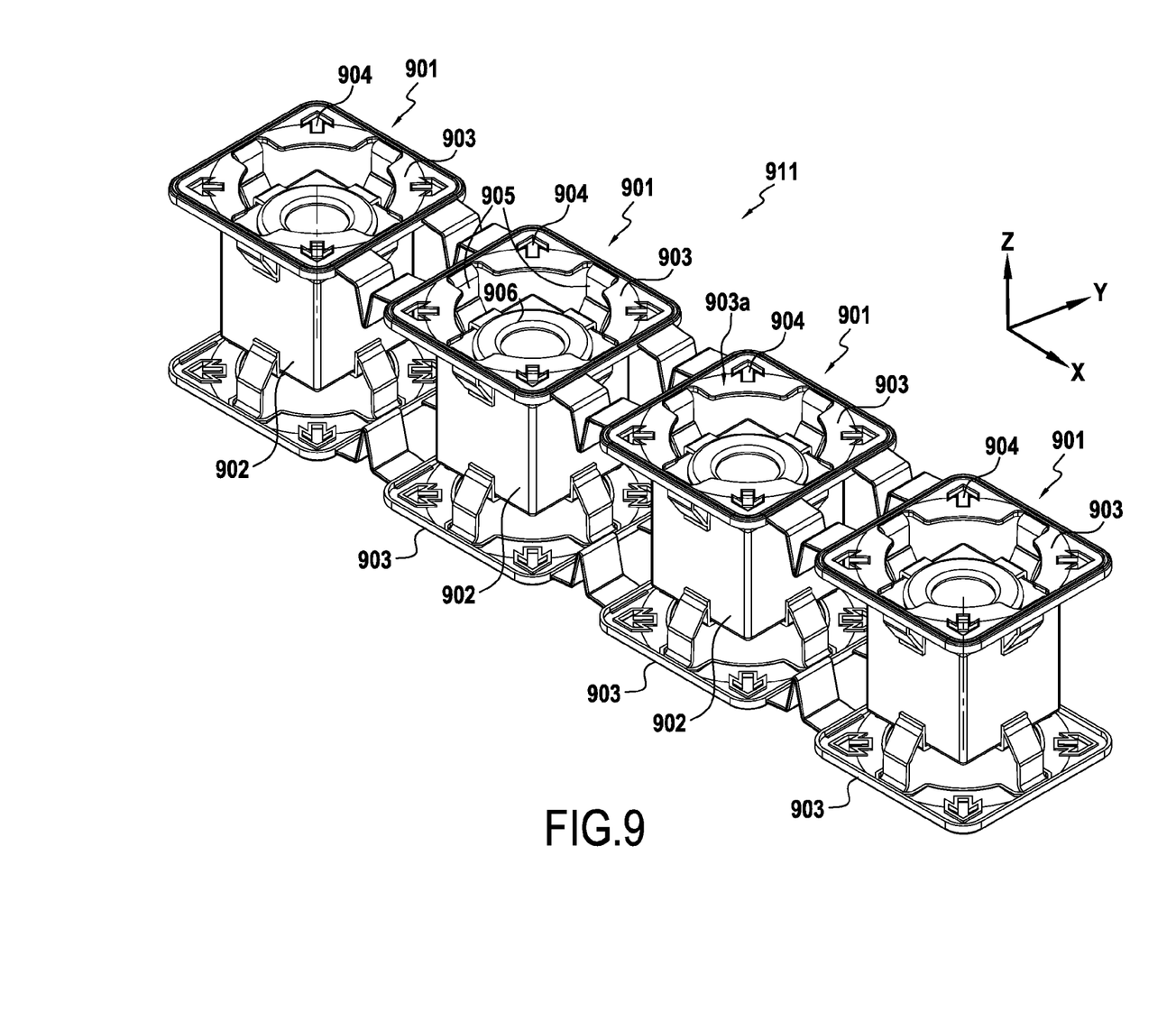
FIG. 9 is a perspective view of cushion or mattress suspension elements forming a module in a ninth embodiment of the invention.

In a ninth embodiment shown in FIG. 9, a plurality of cushion or mattress suspension elements 901 are connected together side by side to form an elongate module 911. As in the third embodiment, each suspension element 901 has spring blades 905 formed integrally with the bearing parts 903 and interposed between the bearing parts 903 and the compressible core 902. The compressible core 902 is made of flexible material and may in particular be made by extruding a high resilience flexible synthetic foam, and in particular a polyurethane foam, presenting density lying more particularly in the range 30 kg/m$^3$ to 150 kg/m$^3$. At each end of each compressible core 902, the connection between the spring blades 905 and the compressible core 902 is made via endpieces 906 that are also formed integrally with the spring blades 905 and the bearing parts 903. Each of the bearing parts 903 also presents an outer bearing area 903a that is substantially larger than the compressible core 902 along an axis Y perpendicular to the axes Z and X, and through orifices 904 providing better ventilation for the cushion or mattress. In addition, flexible connections 910, likewise in the form of spring blades formed integrally with the bearing parts, connect together adjacent bearing parts 903 at each end of the compressible cores 902.

Figure 10:
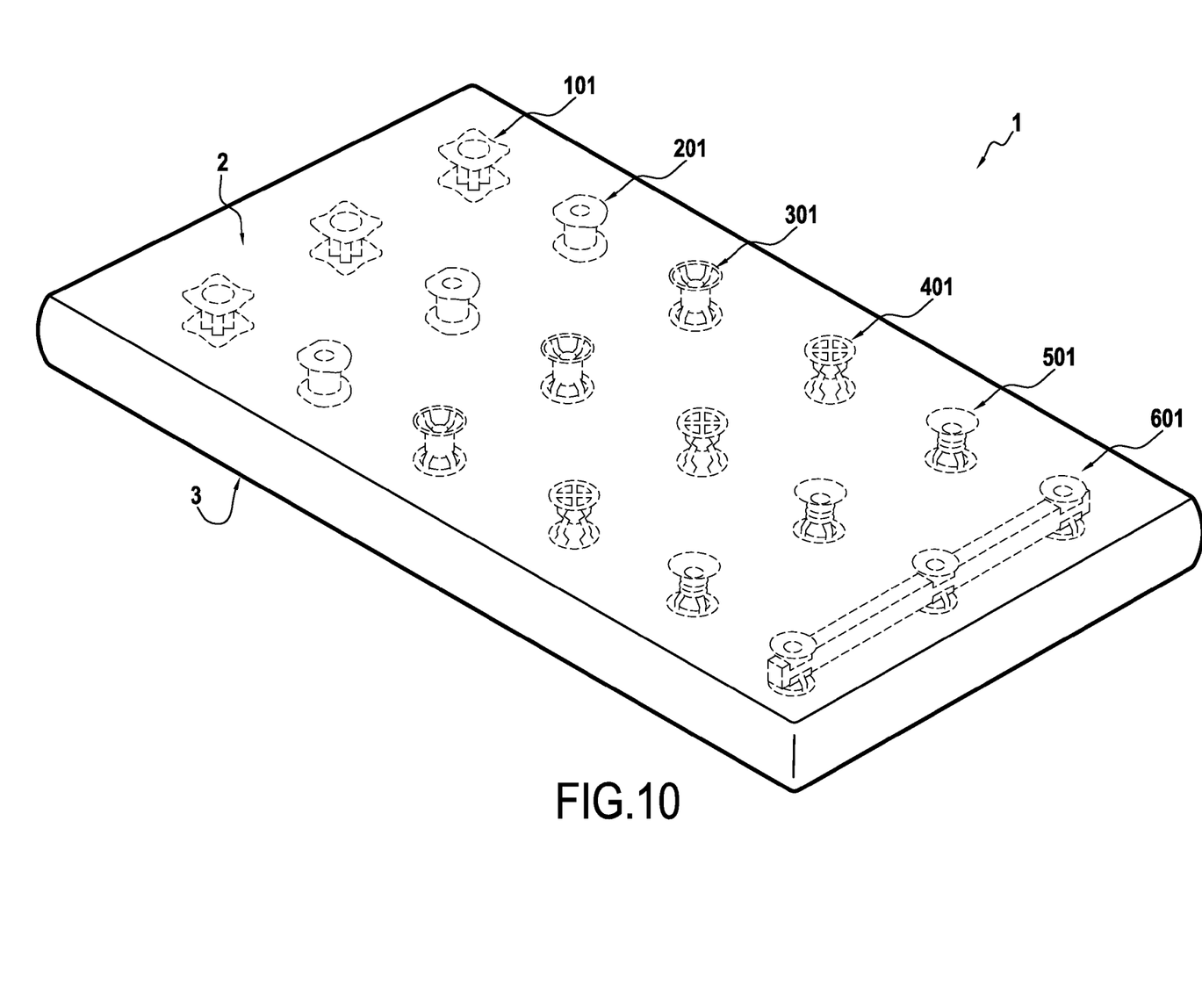
FIG. 10 is a diagrammatic view of a mattress incorporating a plurality of mattress suspension elements in any one of the first to sixth embodiments of the invention.

As can be seen in FIG. 10, cushion or mattress suspension elements 101, 201, 301, 401, 501, and 601 of the various embodiments may be incorporated in a mattress 1 between a bottom face 2 and a top face 3 of the mattress 1, with the axes Z of the elements being substantially perpendicular to these bottom and top faces 2, 3. The mattress 1 may be stuffed with a foam of density that is substantially less than that of the compressible cores 102, 202, 302, 402, 502, 602. Thus, the elements 101, 201, 301, 401, 501, and 601 provide a user with spot bearing points, thereby increasing the perceived firmness and the durability of the mattress 1, while nevertheless limiting its weight and its cost. Like conventional mattress springs, these cushion or mattress suspension elements may also be bagged in order to protect the stuffing. It is also possible to stack a plurality of these elements along the compression axis Z. Although the various elements 102, 201, 301, 401, 501, and 601 in FIG. 10 are shown as being incorporated in a mattress, other applications may be envisaged, in particular in cushions, mainly seat cushions. In this context, a seat cushion should be understood as being any element presenting a flexible surface for making sitting comfortable. Thus, such a seat cushion may be independent of or incorporated in a sofa, a chesterfield, a settee, an armchair, etc.

Although the present invention is described above with reference to specific embodiments, it is clear that various modifications and changes can be performed on those examples without going beyond the general ambit of the invention as defined by the claims. In particular, individual characteristics of the various embodiments shown may be combined in additional embodiments. Consequently, the description and the drawings should be considered in a sense that is illustrative rather than restrictive.

The invention claimed is:

1. A cushion or mattress element comprising:
    at least one compressible core of flexible material and presenting at least one compression axis;
    at least two bearing parts of material that is substantially more rigid than the material of the compressible core, with at least a first bearing part being connected to one end of the compressible core and at least one second bearing part being connected to an end of the compressible core that is opposite along the compression axis, and with each bearing part presenting an outer bearing area that is substantially perpendicular to said compression axis, and in at least one direction perpendicular to the compression axis, that is substantially larger than the compressible core in its relaxed position; and
    at least one spring secured to at least one of the bearing parts and formed integrally with at least one of the bearing parts to which it is secured, wherein said spring includes at least one flexible spring blade.

2. The cushion or mattress element according to claim 1, wherein the flexible material of the compressible core is a foam.

3. The cushion or mattress element according to claim 2, wherein said foam is a high resilience foam.

4. The cushion or mattress element according to claim 1, wherein at least one of the bearing parts presents at least one through orifice for ventilation.

5. The cushion or mattress element according to claim 1, wherein the compressible core has a cross-section relative to the compression axis that is cruciform.

6. The cushion or mattress element according to claim 1, wherein at least one of said bearing parts is fastened to the compressible core by clamping against the compressible core perpendicularly to the compression axis.

7. The cushion or mattress element according to claim 1, wherein said spring is interposed between the bearing part to which it is secured and the compressible core.

8. The cushion or mattress element according to claim 1, wherein said spring is secured to at least one of the bearing parts at each end of the compressible core.

9. The cushion or mattress element according to claim 8, wherein said spring is arranged so as to clamp radially against an intermediate segment of the compressible core at least when the cushion or mattress suspension element is under compression.

10. The cushion or mattress element according to claim 1, having only one of said bearing parts at each end of the compressible core.

11. The cushion or mattress element according to claim 1, having a plurality of said bearing parts at each end of the compressible core.

12. The cushion or mattress element according to claim 11, wherein the bearing parts at each end of the compressible core are laterally connected together by flexible connections.

13. A module comprising a plurality of cushion or mattress elements according to claim 1, wherein at least one of said bearing parts of one of said connection elements is laterally connected by flexible connections to at least one bearing part another one of said elements.

14. A cushion or mattress presenting a top face and a bottom face that is substantially opposite said top face, the cushion or mattress including, between said bottom and top faces at least a plurality of cushion or mattress suspension elements according to claim 1 with their compression axes being substantially perpendicular to said bottom and top faces of the cushion or mattress.

\* \* \* \* \*